(No Model.)
I. N. LINCOLN.
BICYCLE SUPPORT FOR LEARNERS.
No. 578,937. Patented Mar. 16, 1897.
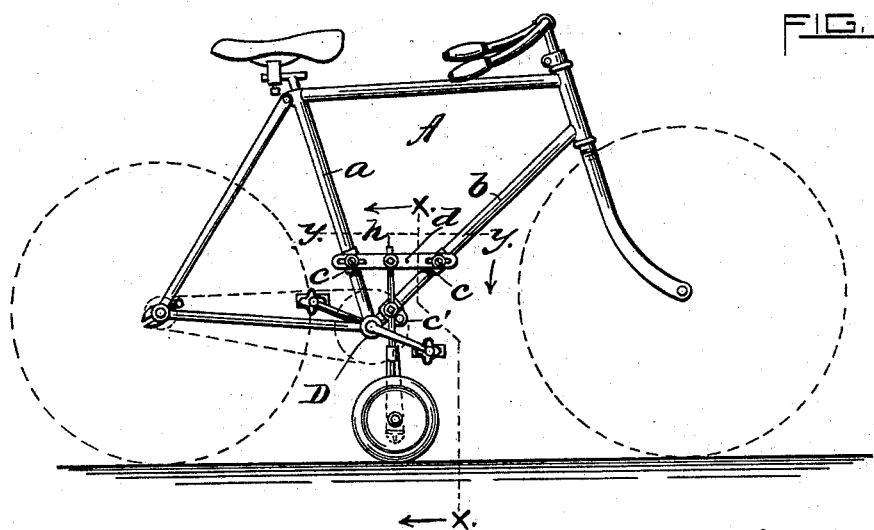
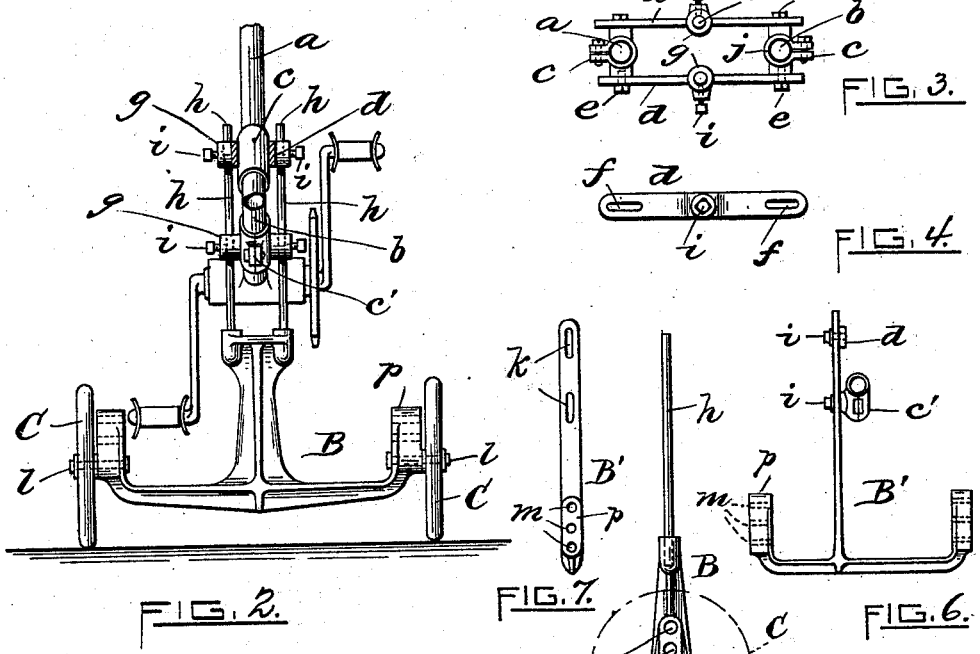
WITNESSES:
INVENTOR,
Isaac N. Lincoln

UNITED STATES PATENT OFFICE.

ISAAC N. LINCOLN, OF PROVIDENCE, RHODE ISLAND.

BICYCLE-SUPPORT FOR LEARNERS.

SPECIFICATION forming part of Letters Patent No. 578,937, dated March 16, 1897.

Application filed December 22, 1896. Serial No. 616,642. (No model.)

*To all whom it may concern:*

Be it known that I, ISAAC N. LINCOLN, of the city and county of Providence, in the State of Rhode Island, have invented an Improvement in Bicycle-Supports for Learners, of which the following is a specification, reference being had to the accompanying drawings.

Like letters indicate like parts.

My invention is an improved attachment for bicycles, and designed to furnish a support to the machines when they are used by learners.

It consists, essentially, of a vertical standard carrying small wheels, said standard made to embrace the lower portion of the frame, of special construction, and adjustments for the same, as will be hereinafter described.

Figure 1 represents my invention as applied to the frame of a bicycle. Fig. 2 is an enlarged cross-sectional view in line $x$ $x$ of Fig. 1. Fig. 3 is a top plan section taken in line $y$ $y$ of the same. Fig. 4 is a side elevation of the adjustable connecting-bar. Fig. 5 is an end elevation of the standard. Figs. 6 and 7 represent the same in a modified form.

In the drawings, A represents the frame of a bicycle as of the ordinary design, having the tubing $a$ and $b$ secured to the crank-bearing in a V-shaped form. Attached to said tubing, at a suitable height above the crank-shaft bearing, are provided clamps $c$ $c$, having side bosses thereon. A similar clamp $c'$ is secured to the bottom of the tube $b$. Fastened to the clamps $c$ $c$ by set-screws $e$ are placed adjustable connecting-bars $d$ $d$, (see Figs. 3 and 4,) which extend laterally with the frame of the machine and provided with elongated slots $f$. Said connecting-bars are further provided with bearings $g$ formed thereon, and having their openings placed vertically in alinement with the openings in the bottom clamp $c'$.

B is the supporting-standard, projecting outwardly from each side of the machine and beneath the crank-pedals and carrying small wheels C, said standard being provided at its upper end, and below the level of the crank-bearing D, with steel rods $h$, fastened thereon and adapted to enter the openings of the bearings of the clamp $c'$ and connecting-bar $g$, respectively, where they are held fast by the adjusting-screws $i$.

Where the length of the crank-arm varies on different makes of machines, I have provided a bearing $p$ on each outer side of the standard, having openings $m$ (see Fig. 5) to receive interchangeable studs $l$ of the wheels, thus constituting a support which can be quickly adjusted to suit the requirements of the rider and as easily removed.

In order to prevent the clamps $c$ $c$ and $c'$ from defacing the tubing of the machine to which they are attached, the bearing-faces $j$ are lined with felt or other suitable material.

This construction of support for a bicycle can be applied to the ladies' style as well and without departing from the spirit of the invention, the essential feature of this improved apparatus being its adaptability to the frame of a bicycle and at its lower V-shaped opening thereon, so that when adjusted in position it supports it laterally on both sides and the small wheels turn freely with the movement of the machine.

In Figs. 6 and 7 I show a modification of the standard B, whereby it may be applied to the machine by a single vertical arm B' to one side of the tubing and fastened to a connecting-bar $d$ and clamp $c'$ in the manner illustrated in Fig. 1. The arm of said standard is provided with vertical slots $k$, and through which set-screws $i$ $i$ enter and secure the arm to the connecting-bar $d$ and clamp $c'$, respectively.

Having thus described my invention, what I claim as new, and desire to secure by Letters Patent, is—

The combination of the frame A, with a vertical standard B having steel rods $h$ secured thereon, and adapted to embrace the lower portion of said frame, with the adjustable clamps $c$ $c$ having side bosses formed thereon, connecting-bars $d$ $d$ provided with elongated slots $f$ $f$ and set-screws $e$ $e$ for securing the bars to the bosses of the clamps, said connecting-bars having vertical bearings $g\ g$ centrally formed thereon, with adjusting-bolts $i\ i$, the clamp $c'$ having side vertical bearings $g\ g$ with adjusting-bolts $i\ i$, said bearings of the connecting-bars and clamp adjusted in alinement with each other, respectively, to receive the rods $h\ h$ of the standard and giving adjustment to the same, with means for adjusting the wheels C to the standard substantially as shown and described.

ISAAC N. LINCOLN.

Witnesses:
HARMON S. BABCOCK,
ARTHUR P. JOHNSON.